Aug. 25, 1959   M. J. THOMAS ET AL   2,901,647
DISCHARGE LAMP AND PHOSPHOR
Filed March 2, 1956
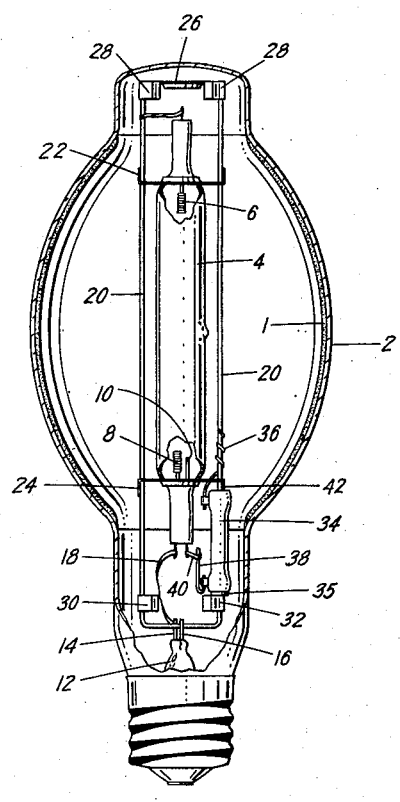
INVENTORS:
MARTHA J. THOMAS
KEITH H. BUTLER
BY Lawrence Brown,
ATTORNEY.

United States Patent Office 2,901,647
Patented Aug. 25, 1959

2,901,647
DISCHARGE LAMP AND PHOSPHOR

Martha J. Thomas, Brookline, and Keith H. Butler, Marblehead, Mass., assignors, by mesne assignments, to Sylvania Electric Products Inc., Wilmington, Del., a corporation of Delaware Application March 2, 1956, Serial No. 569,055

6 Claims. (Cl. 313—25)

This invention relates to fluorescent electric discharge lamps and to phosphors for use in such lamps. In some aspects, the invention relates to combinations of such lamps with phosphors especially suited therefor, and in particular to the combination of a high pressure mercury lamp with certain alkaline earth orthophosphate phosphors.

The discharge in such high pressure mercury lamps emits violet, blue, green and yellow light, but is deficient in red. Accordingly, the lamp gives an abnormal color to many objects, and particularly to the human complexion. The emission, however, also contains a considerable amount of ultraviolet radiation, and various attempts have been made to associate a red-emitting phosphor with the lamp for excitation by said radiation, which is chiefly in the range between 300 and 380 millimicrons, and particularly in the 313 and 366 millimicron mercury wavelengths. The phosphor is placed on the inner surface of a transparent outer jacket which surrounds the discharge tube.

The temperature of the outer jacket in such a lamp is less than that of the discharge tube itself, but is still quite high, ranging from 150° C. to 350° C. in most commercial lamps. The phosphor used must have good fluorescence and chemical stability at those temperatures, and must respond efficiently to the kind of ultraviolet radiation emitted from such lamps.

These severe requirements have heretofore limited the useful phosphors to two materials, namely magnesium arsenate and magnesium fluorgermanate, the activator in each case being tetravalent manganese. Both of these phosphors have very sharply peaked emission bands, centering at about 650 millimicrons. When used as coatings on the outer envelopes of the high pressure mercury vapor lamp they do give excellent color renditions of red objects but the rendition of blues, blue greens and of various other colors is still very poor. Moreover, the visual effectiveness of the red light is so low that the lumen output of the phosphor is lower than the loss by absorption of visible light from the mercury arc, and as a result the phosphor coated lamps give fewer lumens per watt than uncoated lamps. In other words, the gain in red light is obtained at the sacrifice of lamp efficiency.

We have discovered a tin-activated calcium zinc orthophosphate phosphor and found that it can be used in a high pressure mercury lamp to supply red light without any sacrifice of lamp efficiency, and in fact with an actual gain in efficiency. This gain is due to the broad spectrum of visible emission from the phosphor, which not only corrects the red deficiency, but also supplements the light from the discharge throughout the visible spectrum.

Our new phosphors can be described by the chemical formula:

$$aCaO.bZnO.P_2O_5.xSnO$$

One of the most useful of these phosphors appears to be one in which the composition, with reference to the above formula, is approximately:

| Phosphor | $a$ | $b$ | $x$ | Fluorescent Color in H.P.M.V. lamp |
|---|---|---|---|---|
| CaZn phosphate | 2.65 | 0.20 | 0.06 | White. |

The above example is merely illustrative and is not intended to be taken as limiting the scope of our invention. However, in one example of the invention, the outer envelope of a 100 watt H.P.M.V. lamp was coated with a phosphor whose composition was $$2.65CaO.0.20ZnO.P_2O_5.0.06SnO$$

The emission spectrum of the prosphor covered most of the visible spectrum with a very broad peak at about 600 millimicrons. The light output was 38 lumens per watt, while an uncoated lamp was found to give 33 lumens per watt. Color rendition was greatly improved for a wide range of materials of varying color and the human complexion had a quite satisfactory appearance.

In another example, the outer envelope of a 400 watt H.P.M.V. lamp was coated with the same phosphor used in Example I. The finished lamp was found to give 23,800 lumens while a similar lamp made with magnesium fluorgermanate gave only 19,500 lumens. The lamp without any phosphor coating gave 21,000 lumens.

We have found that the amount of light emitted by the phosphor is dependent on the temperature of the outer envelope to which the phosphor coating is applied and that this light can be increased somewhat by increasing the size of this envelope so that the temperature attained corresponds to the optimum operating temperature of the phosphor. We have also found that to obtain the maximum light from the phosphor it is sometimes desirable to change the pressure at which the arc tube operates to a value different from that given the maximum amount of visible light.

Our fluorescent high pressure mercury vapor lamps are particularly suited to lighting buildings where the lights must be suspended at a considerable height above the floor and where the work requires reasonably good color rendition. They are also well suited for street lighting where they will improve visibility for drivers because of the more normal color appearance of objects in the street. The good color rendition also makes it possible to use these improved mercury lamps for show window lighting in stores to provide a high intensity of general illumination.

While we have indicated in the examples above a certain preferred phosphor composition this is intended only as an example and other phosphors giving a broad energy distribution of emitted light, with the light from the phosphor constituting a substantial portion of the total light, and have good emission efficiency at high temperatures may also be used.

Other useful phosphors can be selected from the compositions described hereinafter, some of which are especially suitable for use in high-pressure mercury lamps, and others for use with other sources, such as the low pressure mercury lamp, which is rich in 254 millimicron radiation and deficient in the 300 to 380 millimicron radiation.

Phosphors have been previously known comprising orthophosphate of calcium activated by tin in the stannous state. These phosphors were characterized by having a fluorescent emission containing a relatively large amount of red light. In their preparation the firing temperatures were controlled so as to obtain the form of crystal structure which gives a phosphor with good red emission.

We have discovered that the calcium orthophosphate phosphor can be modified by the replacement of a portion of the calcium by zinc to give phosphors whose emission color varies from a bluish white to a pinkish white, the exact color depending on the composition of the matrix, the amount of tin used as an activator, the temperature of firing and on the wavelength of the ultraviolet used to excite the fluorescence.

Several equivalent chemical formulas may be used to describe our zinc modified calcium orthophosphate phosphors. The first formula is $$a\text{CaO}.b\text{ZnO}.x\text{SnO}.\text{P}_2\text{O}_5$$

Certain features of the method of preparation of these phosphors are not dependent on the relative proportions of calcium and zinc. These features can be described in terms of the formula $$m\text{MO}.\text{P}_2\text{O}_5.x\text{SnO}$$

First, the number of moles of calcium oxide plus zinc oxide plus tin oxide, given by $m+x$ must be less than about 2.98 and must be greater than 2.50. Second, the number of moles of tin oxide, given by $x$, must be between about 0.002 and 0.16. Third, the method of preparation must be such that at least part of the tin is in the stannous, or divalent, state in the finished phosphor. Actually, all of the tin can be in the stannous state with excellent results, although it is not actually necessary that it all be in that state, especially when the amount of tin present is large, say 0.12 gram-atoms per gram-mole of the phosphate radical. However, when the phosphor is to be used in a high pressure mercury lamp, it is best to have substantially all of the tin, or at least the major portion of it, in the stannous state.

In the manufacture of these tin activated phosphors, suitable raw materials are mixed in proportions to give the desired phosphor composition and the mixture is then fired to give the finished phosphor. It is necessary to perform this firing in such a way as to give the amount of stannous tin needed for activation of the finished phosphor.

Our preferred method of firing is to fire first the mixture of selected raw materials, including the tin compound, at a temperature suitable for forming the orthophosphate compound which is the phosphor matrix. This firing gives a white non-fluorescent powder. After this prefiring the material is mixed thoroughly and then refired in a reducing atmosphere which converts the tin to the stannous state and gives a fluorescent material. The preferred reducing atmosphere is a mixture of hydrogen with nitrogen. There are various modifications of this preferred method of firing which will attain the desired results of forming a calcium-zinc orthophosphate containing stannous tin in solid solution which will be readily apparent to those skilled in the art. For example, the raw materials can include stannous oxide and be fired in a slightly reducing atmosphere directly, without being first fired in air, in which case substantially all of the tin will be in the stannous state.

For raw materials we prefer to use calcium hydrogen phosphate, calcium carbonate, zinc oxides and stannic oxide since these are easily obtainable in a high state of purity. Alternative materials include zinc phosphate, zinc carbonate, stannous oxide, stannous chloride, ammonium phosphate and other equivalent sources of calcium, zinc, tin and phosphate. Suitable proportions of these raw materials can be mixed by dry blending, by ball milling in an inert volatile solvent or by other well known methods. We also frequently use a small amount of ammonium chloride to promote the uniform distribution of tin throughout the phosphor but its use is not essential to the preparation. Measurements of the emission spectrum of the beta, or low temperature, form of calcium orthophosphate activated by tin have shown that there is a very broad emission band starting at 400 millimicrons, peaking at 640 millimicrons, and extending into the deep red with slowly decreasing intensity. This mission can be resolved mathematically into two components peaking at 490 and 640 millimicrons. The wavelength of the ultraviolet used to excite the phosphor has little effect on the relative intensity of the two components. When a small amount of zinc is used as a partial replacement for calcium giving a phosphor whose composition can be expressed as $$2.55\text{CaO}.0.30\text{ZnO}.\text{P}_2\text{O}_5.0.025\text{SnO}$$

the emission spectrum can be resolved into three components peaking at about 380, 490 and 620 millimicrons. The relative intensity of these components and hence the color of the emitted light is, we find, quite dependent on the wavelength of the exciting ultraviolet. If 254 millimicron radiation from a low pressure mercury arc lamp is used the component at 620 millimicrons predominates, the component at 380 millimicrons is relatively strong while that at 490 millimicrons is relatively weak. Visually the fluorescence is a pinkish white. In contrast, if radiation from a high pressure mercury vapor lamp, which can for brevity be called a H.P.M.V. lamp, is used to excite the phosphor so that the main excitation is by the 313 millimicron line the 490 component predominates, with the 620 component being somewhat weaker and the 380 component being very weak. Visually the fluorescence is a bluish white.

Similar emission characteristics are found for other phosphors with varying zinc contents between 0.10ZnO and 0.80ZnO with some minor variations in the relative intensities of the components. With zinc contents below 0.10 mole of ZnO there is a more rapid change in emission characteristics toward the emission of beta calcium orthophosphate.

With excitation by 254 millmicron radiation we find that the fluorescent brightness changes only slowly with tin content and tin amounts between 0.01 mole and 0.08 of SnO have substantially the same brightness.

Brightness falls off slowly with tin contents below 0.01 or above 0.08 mole. With excitation by radiation from the H.P.M.V. lamp we have found the behaviour to be quite different with a steady increase in brightness as the tin content increases until a maximum is found with a tin content of about 0.06 mole. With tin contents above 0.06 mole the brightness gradually decreases.

The optimum firing temperatures, both for prefiring and for reduction, are quite dependent on the zinc content of the phosphor. With zinc contents of 0.10 mole we prefer to prefire at 2100° F. and to reduce at a temperature between 1800° and 2000° F. With 0.80 mole of zinc oxide, it is necessary to lower the firing temperature to about 1700° F. for prefiring and to reduce at 1600 to 1700° F. to avoid the fused or strongly sintered product obtained with higher firing temperatures. With intermediate zinc contents an intermediate temperature is used within the limits of 1600 to 2100° F.

While increasing tin content greatly improves the fluorescent response to radiation from an H.P.M.V. lamp it has an adverse effect on the temperature sensitivity. This temperature sensitivity is the decrease in fluorescence as the phosphor temperature increases. A rough indication of this is the temperature at which the fluorescence is 50% of its value at room temperature and we find these temperatures vary with tin content as shown below for a phosphor with 0.20 mole of ZnO and 2.65 moles of CaO for each mole of $P_2O_5$.

| Tin Content, Moles SnO per mole $P_2O_5$ | Temperature for 50% Fluorescence, °C. |
|---|---|
| 0.01 | 367 |
| 0.02 | 327 |
| 0.04 | 327 |
| 0.08 | 292 |

The improved room temperature fluorescence, due to high tin content, is shown below for a phosphor of the same basic matrix composition excited by H.P.M.V. radiation.

| Tin content: | Relative red fluorescence |
|---|---|
| 0.01 | 50 |
| 0.02 | 70 |
| 0.04 | 92 |
| 0.06 | 106 |
| 0.08 | 100 |

Combining these characteristics we find that for each selected temperature at which the phosphor is employed there is an optimum tin content. This is an important feature in the application of these phosphors for use in H.P.M.V. lamps where the outer jacket temperature varies considerably and is dependent on the size of the outer jacket and the power input to the arc tube.

Other objects, advantages and features of the invention will be apparent from the following description in which the figure shows a lamp according to one embodiment of the invention.

In the figure, the lamp shown comprises a fluorescent coating 1 on an outer jacket or envelope 2 of light-transmitting material within which an arc tube 4 is supported. The arc tube 4 is provided with main electrodes 6 and 8 at the ends thereof and an auxiliary electrode 10 disposed adjacent to the main electrode 8. The tube 4 is also provided with a filling of mercury and an inert gas.

The stem press 12 of the outer envelope 2 is provided with a pair of lead-wires 14 and 16, through which the arc tube 4 may be connected to a source of electrical energy. Lead-wire 14 is connected to electrode 8 of the arc tube 4 by a metal ribbon 18. A substantially U-shaped support wire 20 is mounted on lead-wire 16. Collars 22 and 24, which encircle the arc tube 4 adjacent to the constricted ends thereof, are fixedly attached to the legs of the U-shaped wire 20 and thus support the arc tube within the outer envelope 20. A plate 26 bridges the free ends of the U-shaped support wire 20 and is fixed attached thereto to impart rigidity to the structure. The free ends of the U-shaped support wire 20 are also provided with a pair of resilient metal fingers 28 which are fixedly attached thereto, the ends of the fingers 28 frictionally engaging the inner wall of the constricted upper end of the envelope 2 to further support the structure. Similarly, the lower portion of the legs of the U-shaped support wire 20 is provided with resilient metal fingers 30 and 32 which are fixedly attached thereto, the ends of the fingers 30 and 32 frictionally engaging the inner wall of the constricted lower end of the envelope 2.

Inside said lower end, a resistor 34 is disposed on wire 20 and is seated on an insulator button 35 which, in turn, rests on the upper longitudinal edge of resilient metal finger 32. Lead-wire 36 of resistor 34 is wound around support wire 20 and it is also welded thereto. This mode of connection has been found to be particularly advantageous because, even if a weld failure should occur, the tight winding of lead-wire 36 about support wire 20 has been found to be adequate enough to maintain the electrical circuit through these members. Lead-wire 38 of resistor 34 is welded to metal ribbon 40 which is in turn connected to auxiliary electrode 10 of the arc tube 4.

Although considerable rigidity is imparted to the structure by positioning the resistor 34 on support wire 20 and winding lead-wire 36 of resistor 34 about support wire 20 and welding it thereto, additional structure rigidity may be obtained by positioning the resistor 34 on the support wire 20 so that the lower end thereof is seated on insulator button 35 and the upper end thereof is engaged by a depending flange 42 of collar 24. Another advantage which accrues from the use of insulator button 35 is the elimination of arcing, since the button 35 prevents contact between the body of resistor 34 and support wire 20; this displacement prevents electrolysis of and ultimate arcing through of the resistor core.

The fluorescent coating 1 on the inside surface of bulb 2 can be deposited by various methods known in the art, but we have found that a gain of several lumens per watt in lamp efficiency is obtained by the use of the electrostatic coating method described in copending application filed February 20, 1956, by Albert H. Nimblett, Jr., for "Metering Apparatus for Material Divided Into Small Particles."

A general description of the phosphor used has been already given, but a more detailed description is given below, in which various embodiments of our phosphors are described, and certain ones noted as being particularly effective in high pressure mercury lamps. Other embodiments are shown as useful in other types of fluorescent lamps. The examples are merely illustrative and the invention is not to be considered as limited to the examples described.

In these examples, the photometer readings are expressed in arbitrary units giving the relative linear response of a photomultiplier tube with filters between the phosphor and the multiplier tube to select the blue, green and red light emitted.

*Example I*

A dry mixture of the following ingredients was made and fired in porcelain crucibles in air for 1 hour at 1950° F.

| Ingredient: | Moles |
|---|---|
| $CaHPO_4$ | 2.00 |
| $CaCO_3$ | 0.65 |
| $ZnCO_3$ | 0.20 |
| $SnO_2$ | 0.02 |
| $NH_4Cl$ | 0.02 |

The non-fluorescent product was then refired in a mixture of 2% hydrogen and 98% nitrogen for ½ hour at 1800° F. to give a phosphor with excellent fluorescence.

The composition of the fired phosphor was:

| Ingredient: | Moles |
|---|---|
| CaO | 2.65 |
| ZnO | 0.20 |
| $P_2O_5$ | 1.00 |
| SnO | 0.02 |

The photometer readings with two types of excitation were:

| | Red | Green | Blue |
|---|---|---|---|
| Germicidal Lamp | 106 | 94 | 78 |
| H.P.M.V. lamp | 105 | 100 | 73 |

The radiation from the germicidal lamp was chiefly of about 254 millimicrons wavelength. That from the H.P.M.V. lamp was largely 313 and 366 millimicrons. The radiation was that emanating from the inner discharge tube of an H.P.M.V. lamp, the discharge tube operating at high pressure but being without an outer envelope. The phosphor was on a plaque at about room temperature.

Example II

A dry mixture of the following ingredients was made and fired in porcelain crucibles in air for 1 hour at 2100° F.

| Ingredient: | Moles |
|---|---|
| $CaHPO_4$ | 2.00 |
| $CaCO_3$ | 0.75 |
| ZnO | 0.10 |
| $SnO_2$ | 0.02 |
| $NH_4Cl$ | 0.02 |

The composition of the fired phosphor was:

| Ingredient: | Moles |
|---|---|
| CaO | 2.75 |
| ZnO | 0.10 |
| $P_2O_5$ | 1.00 |
| SnO | 0.02 |

The fired powder was reduced in 2% hydrogen 98% nitrogen for ½ hour at 2000° F. The photometer readings were:

|  | Red | Green | Blue |
|---|---|---|---|
| Germicidal | 115 | 95 | 76 |
| H.P.M.V. Lamp | 80 | 86 | 82 |

Example III

A mixture similar to Example II but containing 0.30 mole ZnO and 0.55 mole of $CaCO_3$ was fired at 2100° F. and then reduced in 2% hydrogen at 2000° F. The photometer readings were:

|  | Red | Green | Blue |
|---|---|---|---|
| Germicidal | 111 | 101 | 85 |
| H.P.M.V. | 109 | 95 | 62 |

Example IV

A mixture similar to Example II but containing 0.80 mole ZnO and 0.05 mole of $CaCO_3$ was fired at 1700° F. and then reduced in 2% hydrogen at 1700° F. The photometer readings were:

|  | Red | Green | Blue |
|---|---|---|---|
| Germicidal | 100 | 87 | 73 |
| H.P.M.V. | 100 | 86 | 50 |

Example V

Mixtures similar to Example II, containing 0.20 mole of ZnO and 0.65 mole of $CaCO_3$ were made up with varying contents of $SnO_2$. These were prefired in air at 2000° F. and then reduced in 2% hydrogen at 2000° F. The photometer readings were:

| SnO | Germicidal | | | H.P.M.V. | | |
|---|---|---|---|---|---|---|
|  | Red | Green | Blue | Red | Green | Blue |
| 0.01 | 104 | 91 | 79 | 50 | 80 | 84 |
| 0.02 | 110 | 100 | 87 | 70 | 104 | 110 |
| 0.04 | 111 | 105 | 91 | 92 | 138 | 141 |
| 0.06 | 117 | 110 | 100 | 106 | 165 | 158 |
| 0.08 | 104 | 98 | 82 | 100 | 142 | 140 |

The slight effect of tin content with germicidal lamp excitation and the large effect with H.P.M.V. excitation is apparent.

Mixtures of the same raw materials and proportions as in the above Example V can be made using a stannous oxide in place of stannic oxide as the source of tin, and the material fired directly in the 2% hydrogen reducing atmosphere, with substantially the same results as in the above table. In that case, the tin will remain entirely in the stannous state from the beginning of the manufacture of the phosphor.

These new phosphors are useful in fluorescent lamps giving a lamp similar to those made with beta calcium orthophosphate with a high amount of red light present in the spectrum. They are also useful for color correction and efficiency improvement in high pressure mercury lamps as previously explained. High stannous tin contents are desirable in the latter case, despite the percentage loss of emission with temperature being greater with the higher tin content. The actual brightness in an H.P.M.V. at high temperature is greater with high tin content.

The raw materials from which the phosphor is made should be free of heavy metal impurities such as iron, nickel, cobalt, vanadium, chromium, copper and other materials which act as poisons for fluorescence. The raw materials should also be free of anion impurities such as nitrate and sulfate, since such impurities are found to have a detrimental affect on fluorescence, especially when the phosphor is excited by longer wavelength ultraviolet such as 313 millimicrons.

What we claim is:

1. A high pressure mercury lamp comprising a mercury discharge tube, a transparent outer jacket around said tube but spaced therefrom, and a coating of a calcium zinc phosphate phosphor on said jacket, said phosphor comprising between about 0.1 and 0.8 mole of zinc oxide per mole of phosphorous pentoxide present, between about 2.50 to 2.98 moles of combined calcium oxide and zinc oxide per mole of phosphorous pentoxide, and about 0.03 to 0.12 mole of stannous oxide per mole of phosphorous pentoxide.

2. A high pressure mercury vapor lamp comprising a mercury discharge tube, an outer jacket therearound but spaced therefrom, and a phosphor on said outer jacket, said phosphor being tin-activated calcium zinc orthophosphate containing about 0.2 mole zinc oxide, 2.65 moles calcium oxide, and 0.06 mole of stannous oxide per mole of phosphorous pentoxide.

3. A calcium zinc phosphate phosphor activated by stannous tin.

4. A calcium zinc phosphate phosphor activated by between 0.002 to 0.16 mole of stannous oxide per mole of phosphorous pentoxide.

5. A calcium zinc phosphate phosphor activated by between 0.002 to 0.12 mole of stannous oxide per mole of phosphorous pentoxide, and containing between about 0.1 and about 0.8 mole of zinc oxide per gram-mole of phosphorous pentoxide.

6. The phosphor of claim 3, in which the number of moles of calcium oxide plus zinc oxide is between about 2.5 and about 2.98 for each mole of phosphorous pentoxide.

References Cited in the file of this patent

UNITED STATES PATENTS

| 2,563,900 | Wollentin et al. | Aug. 14, 1951 |
| 2,723,958 | Shaffer et al. | Nov. 15, 1955 |
| 2,748,303 | Thorington | May 29, 1956 |